United States Patent Office 2,740,780
Patented Apr. 3, 1956

2,740,780

SUBSTITUTED AZACYCLOOCTANES AND PROCESS

Julius Diamond, Philadelphia, and William F. Bruce, Havertown, Pa., assignors to American Home Products Corporation, New York, N. Y., a corporation of Delaware No Drawing. Application January 6, 1954,
Serial No. 402,585

7 Claims. (Cl. 260—239)

This invention relates to cyclic compounds and more particularly involves azacycloalkanes and the method for preparing them.

The application is a continuation-in-part of application Serial No. 297,185, filed July 3, 1952 now Patent No. 2,666,050.

The preparation of the compounds involves as a first step the alkylation of a 2-aryl-4-dialkylamino butyronitrile with a polymethylene sulfonic acid ester or halide having 4 to 8 methylene groups, this reaction being carried out in the presence of an active hydrogen reagent. Following the alkylation reaction, the product obtained is cyclicized, utilizing an inert high boiling solvent. The cyclic compound produced is hydrolyzed and then esterified to prepare the carbalkoxy compound, or the cyanoazacycloalkane is reacted with an alkyl Grignard or alkyl-lithium and then hydrolyzed to form an acyl azacycloalkane.

The following reactions will illustrate the process steps:

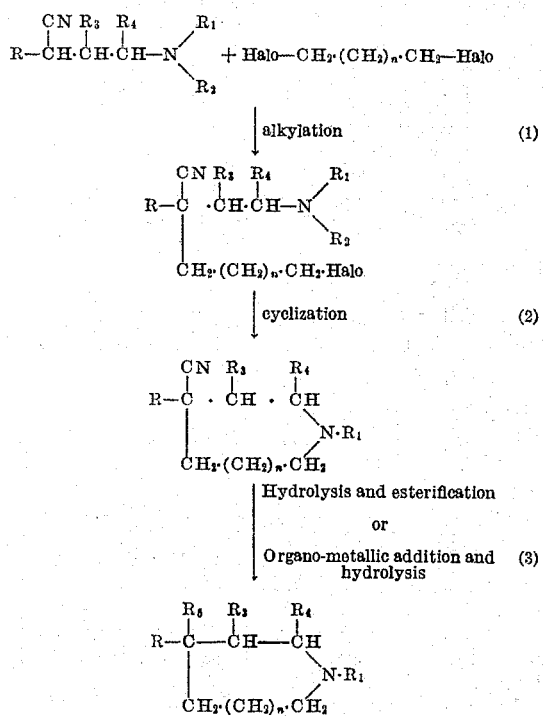

Prior art procedures, notably procedures disclosed by Miescher and Kaegi in numerous patents, such as the series 2,486,792–796, cannot be utilized in preparing the larger ring compounds of the invention because the desired intermediate 8 to 12-membered ring compounds produced at reaction (2) in the above formulated procedure fail to form when following the teaching in these patents. Consequently the disclosure in these patents cannot be extended to cover the larger ring compounds.

In the above formulae, R is intended to represent an aryl radical, specifically a substituted or unsubstituted phenyl or a naphthyl or benzhydryl radical. Preferred substitutents on a ring, which may be in any position and ranging from one to three, are lower alkyl, lower alkoxy, halogen, nitro, hydroxy, aliphatic acyl and acyloxy, amino and mono and di-lower alkyl-substituted amino radicals.

The radicals $R_1$ and $R_2$, which may be either similar or dissimilar to each other, are intended to stand for lower alkyls and preferably alkyls of 1 to 4 carbon atoms. The radicals $R_3$ and $R_4$ may represent either hydrogen, methyl or ethyl groups.

With regard to the di-halo-alkane reactant, the designation "halo" is intended to stand for either chlorine, bromine or iodine. It may be noted that both halogen groups may be similar, i. e., both standing for bromine, for example, or they may be dissimilar, i. e., one standing for bromine, for example, and the other for chlorine.

The radical $R_5$ represents a lower alkyl ester or lower aliphatic acyl group connected to the ring carbon at the carbonyl carbon, with the alkyl group preferably having no more than 3 carbon atoms.

The designation $n$ is intended to stand for a whole number, from 2 to 6 inclusive.

The starting compounds meeting the qualifications noted hereinabove, which may be prepared by well-known procedures, are reacted in the presence of an active hydrogen reactant, preferably an alkali metal amide such as sodium, potassium or lithium amide although phenylsodium, phenyl-lithium or butyl-lithium are also operable. The reaction is carried out in the presence of a solvent which may be either ethyl ether or an aromatic hydrocarbon such as benzene, toluene or xylene. Substantially anhydrous conditions should be utilized for best results and, while not necessary, an inert atmosphere, such as nitrogen gas, is desirable for the reaction. The reaction goes easily at ordinary temperatures, and, although room temperature or a temperature from about 10° to 35° C. is preferred, one may operate in the broader range from about −10° C. to about 50° C.

Following the alkylation step the novel azacycloalkanes are prepared by a cyclization reaction carried out by heating the alkylated product in the range of about 200 to about 250° C. If desired, an inert organic solvent may be used, such solvent being selected with a boiling range within the reactive temperature range noted and under refluxing conditions. Tetralin, nitrobenzene, and especially the higher alcohols have been found effective.

The alcohols, n-decyl alcohol, trimethyl nonyl alcohol and 5-ethyl-2-nonyl alcohol are especialy suitabe as refluxing solvents.

On obtaining the cyclic aminonitrile, the latter may then be either hydrolyzed to an acid and then esterified, or it may be changed to an acyl group by alkyl-lithium or an alkyl Grignard followed by hydrolysis. To form the acid-ester, the aminonitrile is hydrolyzed under either acid or alkaline conditions. For acid hydrolysis, one may use any strong acid such as syrupy phosphoric acid, concentrated hydrobromic acid, etc., although 80–95% sulfuric acid is preferred. Alkaline hydrolysis is also feasible, and, as an example, potassium hydroxide in an alkylene glycol will give the desired product. The hydrolysis reaction may be carried out at a temperature of about 100–150° C. with a more preferred range of about 110–120° C.

The cyclic acid or salt obtained as a product of the hydyrolysis step is then esterified using a substantially anhydrous lower aliphatic alcohol, preferably one having no more than three carbon atoms and, more preferably, using ethyl alcohol. The final cyclic ester may be obtained by concentration of the esterification reaction mixture, neutralizing with an aqueous alkaline solution, extracting the free base with a selective solvent and finally distilling off the solvent medium.

To form acyl-azacycloalkanes, one dissolves the nitrile in absolute ether and adds this solution to $R_5 \cdot MgBr$ or $R_5 \cdot Li$, in absolute ether. $R_5$ represents the radical indicated hereinabove. Immediate reaction occurs. The addition reaction is completed by warming on a steam bath and if necessary by replacing the ether with toluene. The reaction mixture is poured on ice in the presence of hydrochloric acid warmed gently to hydrolyze the imino compound formed as an intermediate. The acyl-azacycloalkane product is then in the aqueous layer and is obtained by separating the two layers, making the aqueous layer alkaline and extracting with ether. The ether extract is then distilled to obtain the desired product.

As a specific illustration of the process, the following procedure will serve to describe the invention in greater detail.

off at atmospheric pressure, the cooled residue poured into an ice-cold saturated aqueous sodium carbonate solution, then extracted with ether. The ether extract was dried, filtered, and distilled giving the ester base (III), B. P. 130–133° C. (0.3 mm.), $n_D^{26}$ 1.5215, $d_4^{26}$ 1.042.

*Anal.*—Calcd. for $C_{17}H_{25}O_2N$: C, 74.18; H, 9.15; N, 5.08; $M_D$ 80.70. Found: C, 74.07; H, 9.06; N, 5.64; $M_D$ 80.68.

The methiodide, M. P. 165–167° C. dec., was formed in a mixture of acetone and ether.

*Anal.*—Calcd. for $C_{18}H_{28}O_2NI$: C, 51.82; H, 6.76; N, 3.36; I, 30.5. Found: C, 51.92; H, 6.86; N, 3.09; I, 30.5.

The azacycloalkanes have numerous uses. One important use is in the formation of long-chain aliphatic quaternary compounds which may be prepared in known manner by reacting the cycloalkanes with a long-chain aliphatic halide having from 8 to 18 carbon atoms, such as lauryl bromide, the temperature of reaction ranging from about 50° to about 150° C. Still another use of these alkylenimine compounds is in their ability to com-

*Synthesis of 4-carbethoxy-4-phenyl-1-methyl-azacyclooctane*

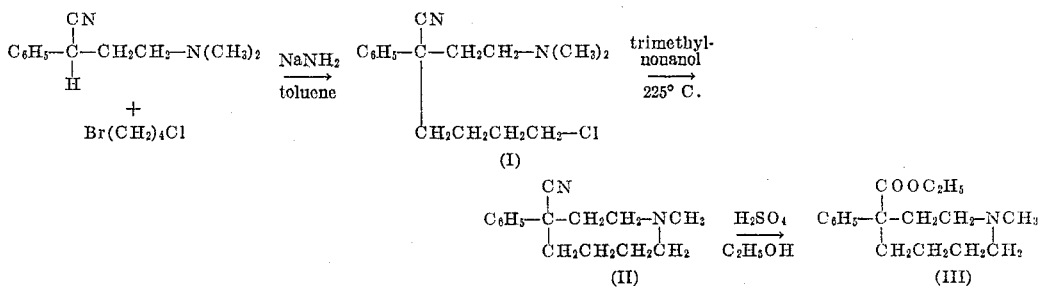

A solution of 0.75 mole (141 g.) of 2-phenyl-4-dimethylaminobutyronitrile in 300 ml. of ether was added dropwise to 0.90 mole (35.1 g.) of sodamide suspended in 700 ml. of ether. The operations were carried out at 30° C. under a nitrogen atmosphere with stirring. The mixture was refluxed 2 hours, then cooled to −30° C. A solution of 0.89 mole (153 g.) of tetramethylene chlorobromide in 300 ml. of ether was added dropwise at −25° to −20° C. On completing the addition, the temperature was gradually allowed to rise to room temperature and the mixture then stood overnight. The precipitated inorganic salts were filtered off and the ether distilled from the filtrate under vacuum. The liquid residue contained the 1,7-aminochloride (I).

One liter of trimethylnonanol was added to the residue and the resulting solution then added dropwise to 1 liter of stirred, refluxing trimethylnonanol (B. P. 225° C.) during 1.5 hours. The solution was stirred and refluxed an additional 2 hours then cooled under a nitrogen atmosphere. Dilute hydrochloric acid was used to extract out the amine. The acid extract was washed with ether, then basified with sodium hydroxide solution, and extracted with ether. The ether extract was dried, filtered, and evaporated down to leave a red viscous syrupy residue. The cyano base (II) was distilled away from a large mass of resinous material at 140–160° C. (0.3–0.4 mm.). Redistillation gave a yellow liquid, B. P. 130–134° C. (0.3 mm.), $n_D^{27}$ 1.5270, $d_4^{27}$ 1.010.

*Anal.*—Calcd. for $C_{15}H_{20}N_2$: C, 78.90; H, 8.82; N, 12.75; $M_D$ 69.54. Found: C, 79.06; H, 9.32; N, 12.57; $M_D$ 69.48.

The picrate, M. P. 158–59° C., was formed in acetone-methanol.

*Anal.*—Calcd. for $C_{21}H_{23}N_5O_7$: C, 55.18; H, 5.07; N, 15.32. Found: C, 55.33; H, 4.89; N, 15.13.

A mixture of 0.04 mole (9.1 g.) of the cyano base (II), 10.6 g. of 98% sulfuric acid, and 2.6 g. of water was heated at 115–130° C. during 3 hours. The mixture was cooled somewhat, 75 ml. of absolute ethanol added, and the mixture refluxed overnight. The alcohol was distilled bine with penicillin to form salts therewith, this procedure being useful in purifying penicillin and even obtaining therapeutically valuable penicillin salts. In addition, an analgesic action has been noted in a number of compounds. The above uses apply equally to the free bases or their acid-addition salts.

Where it is desired that the aryl radical include one or more hydroxy-substituents on the ring, the above described reactions should utilize corresponding alkoxy-substituted compounds as reactants. After the alkoxy-substituted aryl-cyano-azacycloalkane is formed, one may convert the alkoxy group to a hydroxy group by dissolving the nitrile in 48% hydrobromic acid, heating until evolution of alkyl bromide begins. The temperature is maintained until reaction is completed, after which the excess acid is pumped off. The residue is then esterified by addition of alcohol and sulfuric acid and heating to refluxing overnight. The solution is then poured on ice and the sulfuric acid catalyst is removed by shaking with excess barium carbonate. The inorganic salts are filtered off and the filtrate is concentrated to dryness. The product may be recrystallized from alcohol.

The acid-addition salts which may include the salts of the inorganic or carboxylic acids may be prepared in the manner described in application Serial No. 297,185. Acids of the type indicated in said latter application yield preferred salts.

The therapeutically useful compounds, more particularly those possessing analgesic action, may be utilized either orally, in suppository form or parenterally. For oral use, the compounds may be combined in known manner in the form of an elixir or other liquid form with excipients, such as suspending and flavoring agents. They may also be utilized in dry form, combined in the usual way with binding agents, sugars and other excipients for tablet or capsule form.

We claim:

1. The process comprising heating a 3-phenyl-3-cyano-1-di-loweralkylamino-omega-haloheptane, to a temperature in the range of about 200° to about 250° C., said heating being carried out under refluxing conditions utilizing an inert organic solvent, thereby forming an azacyclooctane reaction product.

2. The process of claim 1, wherein the inert solvent is a higher aliphatic alcohol.

3. A compound selected from the group consisting of a heterocyclic base having the formula

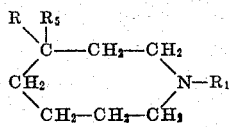

and the acid-addition salts thereof; wherein R represents a phenyl radical, $R_1$ stands for a lower alkyl and $R_5$ is a member of the group consisting of CN and COO·lower alkyl.

4. As a new product, 4-phenyl-4-cyano-N-loweralkyl-azacyclooctane.

5. As a new product, 4-phenyl-4-carb-loweralkoxy-N-loweralkyl-azacyclooctane.

6. As a new product, 4-cyano-4-phenyl-1-methyl-azacyclooctane.

7. As a new product, 4-carbethoxy-4-phenyl-1-methyl-azacyclooctane.

References Cited in the file of this patent

UNITED STATES PATENTS 2,666,050    Diamond et al. _____ Jan. 12, 1954

FOREIGN PATENTS 611,248    Germany _____ Mar. 25, 1935